Figures 1, 2, 3:
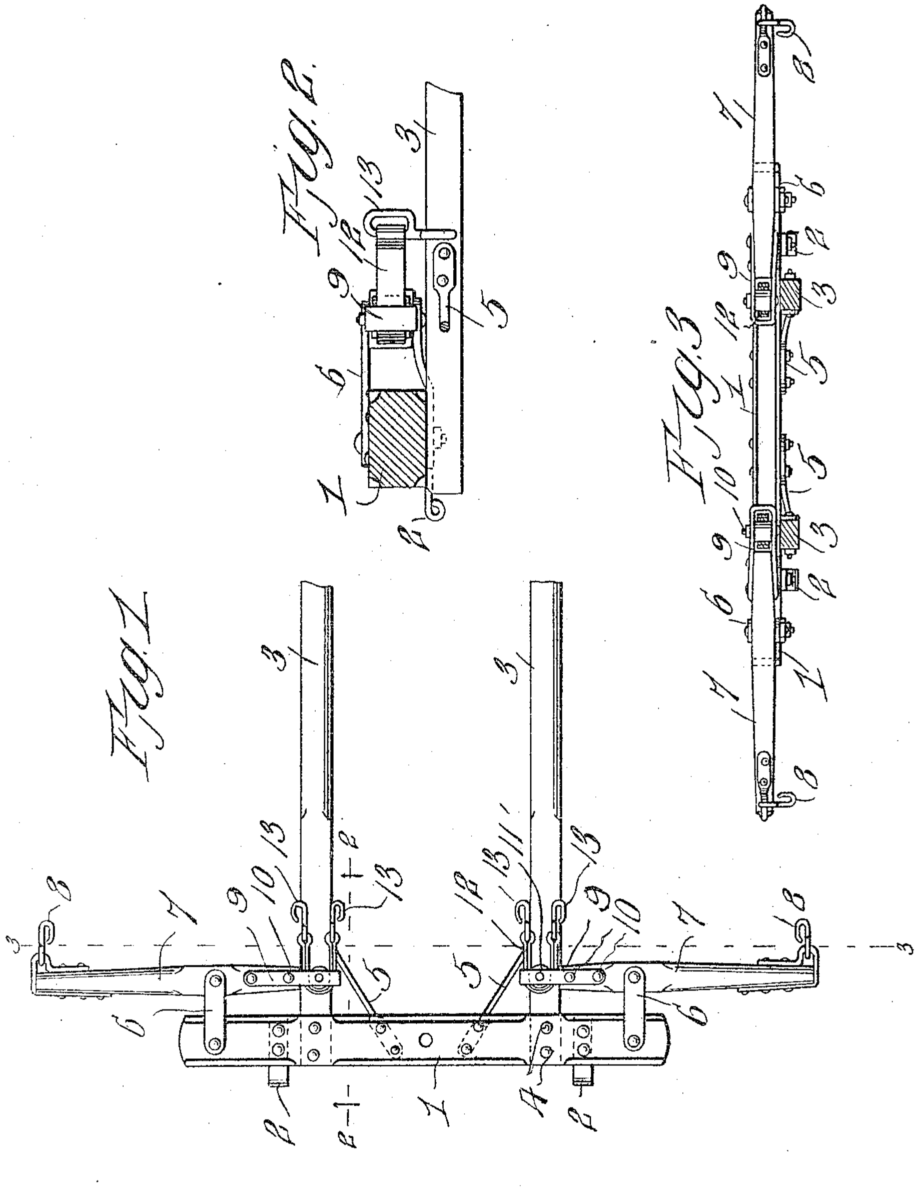

G. I. BRISTOL.

DRAFT EVENER.

APPLICATION FILED JULY 21, 1908.

957,736. Patented May 10, 1910.

Inventor

Gaylord I. Bristol,

By Victor J. Evans

Attorney

Witnesses

F. C. Ackman Jr.

E. P. Bungler

ANDREW B. GRAHAM CO., PHOTO-LITHOGRAPHERS, WASHINGTON, D. C.

UNITED STATES PATENT OFFICE.

GAYLORD I. BRISTOL, OF CROSS FORK, PENNSYLVANIA.

DRAFT-EVENER.

957,736. Specification of Letters Patent. Patented May 10, 1910.

Application filed July 21, 1908. Serial No. 444,584.

*To all whom it may concern:*

Be it known that I, Gaylord I. Bristol, a citizen of the United States of America, residing at Cross Fork, in the county of Potter and State of Pennsylvania, have invented new and useful Improvements in Draft-Eveners, of which the following is a specification.

This invention relates to draft eveners, and one of the principal objects of the same is to provide a simple and reliable draft attachment which will accommodate three horses and which will equalize the draft of the animals.

Another object of the invention is to connect to a single-horse vehicle a draft attachment which will accommodate one horse upon each side of the central draft animal and to properly equalize the draft of the three animals.

These and other objects may be attained by means of the construction illustrated in the accompanying drawing, in which,—

Figure 1 is a plan view of a draft evener constructed and arranged in accordance with my invention. Fig. 2 is a sectional view on the line 2—2 of Fig. 1 looking in the direction indicated by the arrows. Fig. 3 is a transverse sectional view on the line 3—3 of Fig. 1.

Referring to the drawing, the numeral 1 designates a draft bar provided with metal straps or thill couplings 2, said draft bar having a pair of thills 3 connected thereto by means of bolts 4. Braces 5 extend from the draft bar 1 to the thills 3 on the inside thereof. The draft bar 1 extends laterally upon both ends beyond the thills 3, and connected to said projecting ends by means of suitable links 6 are the swingletrees 7. The links 6 are pivoted to the draft bar and to the swingletrees 7. It will be seen that the swingletrees 7 are connected to the draft bar 1 at a point some distance from the center of the swingletrees. Draft devices 8 are connected to the outer ends of the swingletrees, and at the inner ends of said swingletrees a pair of projecting plates 9 are secured by bolts 10. Journaled between the plates 9 is a roller 11, and passed around the roller 11 is a draft strap 12 provided with draft hooks 13 at its ends for connection with the draft chains of the harness.

The operation of my invention will be readily understood from the foregoing description. One of the animals is placed between the thills 3 and connected to the inner draft hooks 13. The outer animals are connected to the outer draft hooks 13 and to the hooks 8. The three animals are thus connected to the vehicle or implement so that the draft of each animal has a direct influence upon the others.

My invention is of simple construction, can be applied to any single-horse vehicle or agricultural implement and serves to equalize the draft between the three animals.

I claim:—

The herein described three-horse evener consisting of a draft bar, thills secured to the draft bar at suitable distances from the ends thereof, swingletrees connected to the outer ends of said draft bar by links pivoted to said swingletrees at points to one side of the centers thereof, draft hooks on the outer ends of the swingletrees, plates projecting from the inner ends of the swingletrees, rollers journaled between said plates and lying directly over the inner ends of the thills, straps passing around the rollers and extending in lines parallel with and on either side of the thills, and draft hooks on the opposite ends of the straps and disposed on opposite sides of the thills.

In testimony whereof I affix my signature in presence of two witnesses.

GAYLORD I. BRISTOL.

Witnesses:

B. E. Stevens,

S. G. Mears.